Jan. 14, 1930.  T. B. FUNK  1,743,712
HUB BEARING
Filed Jan. 28, 1924   2 Sheets-Sheet 1
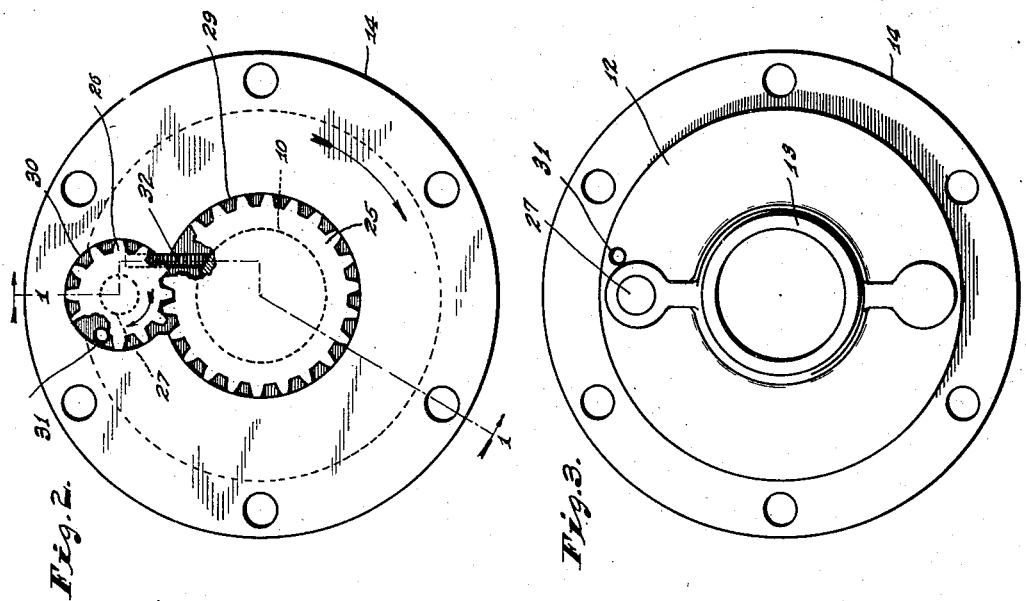
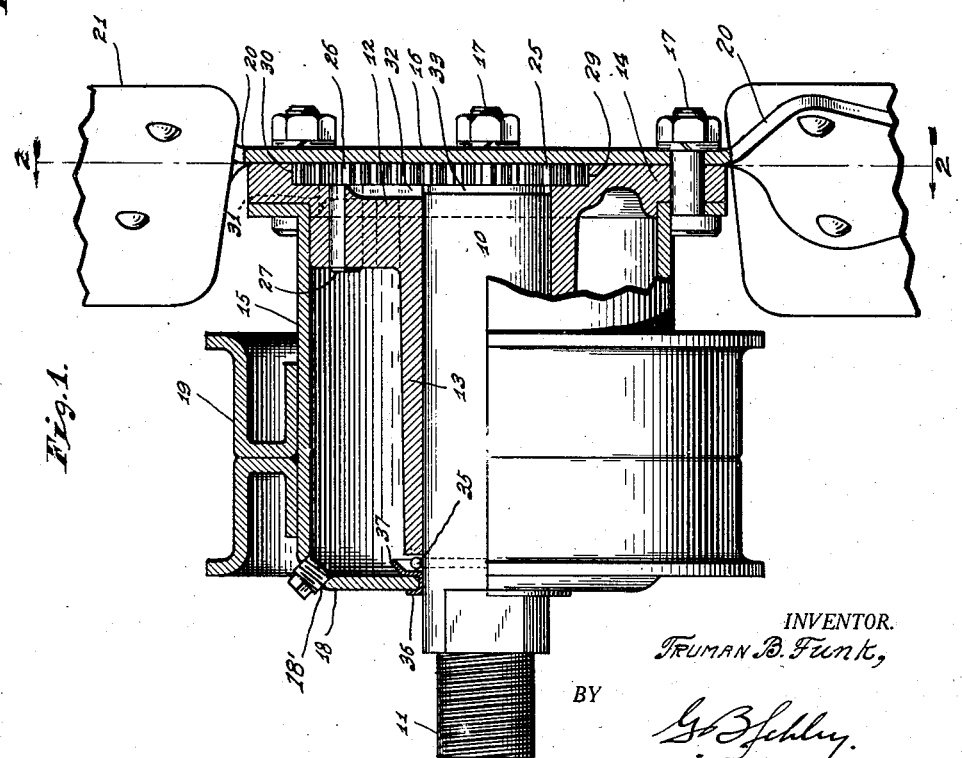
INVENTOR.
Truman B. Funk,
BY
ATTORNEY.

Jan. 14, 1930.　　　T. B. FUNK　　　1,743,712
HUB BEARING
Filed Jan. 28, 1924　　2 Sheets-Sheet 2
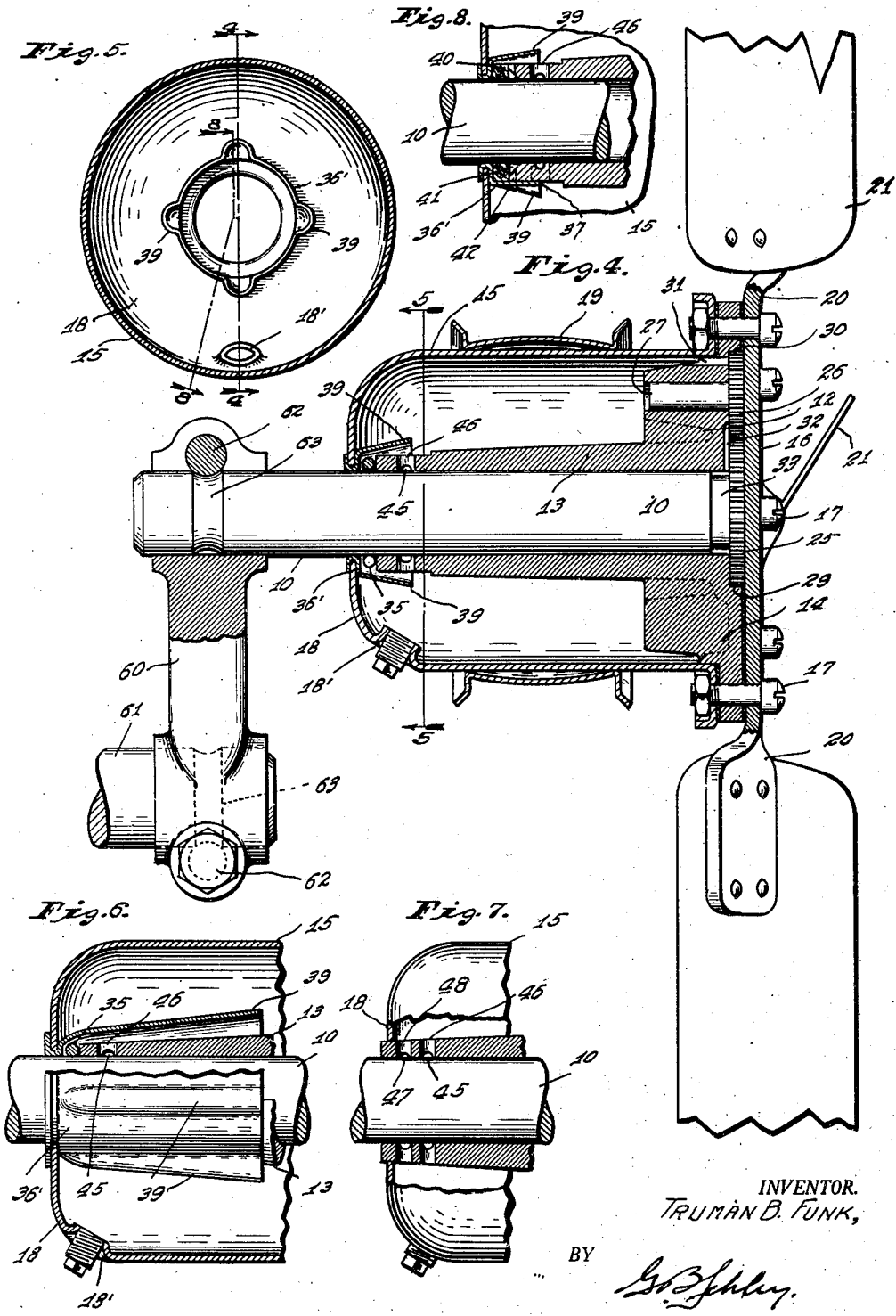
INVENTOR.
TRUMAN B. FUNK,
BY
ATTORNEY.

Patented Jan. 14, 1930

1,743,712

UNITED STATES PATENT OFFICE

TRUMAN B. FUNK, OF JACKSON, MICHIGAN, ASSIGNOR TO AUTOMOTIVE FAN & BEARING COMPANY, OF JACKSON, MICHIGAN, A CORPORATION OF MICHIGAN

HUB BEARING

Application filed January 28, 1924. Serial No. 688,949.

It is the object of my invention to prevent leakage around shafts, especially around stationary shafts, such as the stud shafts supporting the rotating fans used on automobiles.

In the operation of automobile fans, it is found that the average automobilist will pay no attention whatever to the lubrication of his fan. As there has always heretofore been some leakage around the supporting shaft of such a fan, especially when the fan stops, in the course of time this exhausts the supply of lubricant, even though the leakage be very slight; and when the fan runs dry the troubles begin. By my invention I aim to substantially eliminate even this slight leakage, and to do so with a construction which, while most effective, is at the same time very inexpensive to manufacture and install; and in the preferred form of my invention to avoid leakage of oil even when the fan is stood on end.

The accompanying drawing illustrates my invention: Fig. 1 is a vertical longitudinal section, on the line 1—1 of Fig. 2, through a fan construction embodying one form of my invention, with the lower part of the pulley in elevation; Fig. 2 is a section on the line 2—2 of Fig. 1; Fig. 3 is a view of the supporting hub, taken from the left of Fig. 1, with the hub-casing removed; Fig. 4 is a vertical longitudinal section, about on the line 4—4 of Fig. 5, through a fan construction embodying another form of my invention, which form has some advantages over the other form; Fig. 5 is a section on the line 5—5 of Fig. 4; and Figs. 6, 7, and 8 are fragmental sectional views, viewed in the same way as Figs. 1 and 4, showing other constructions embodying my invention, more or less fully, but showing only that part of the construction where the shaft passes out from the casing, and the part adjacent thereto.

I have shown my invention in connection with the general types of fans and lubricating systems shown in my prior Patents Nos. 1,370,422, 1,378,587, and 1,378,588, granted respectively on March 1, 1921, and May 17, 1921; for while my invention is not limited to that type of fan, I prefer to use the pressure-lubrication system of the type shown in such patents.

The fan as a whole is carried by a supporting shaft 10, which is a stationary stud-shaft supported at one end, on any suitable stationary support. In the arrangement shown in Fig. 1, the supporting end of the shaft 10 is provided with screw threads 11, by which it is mounted in its support. On such stud-shaft 10 is mounted a supporting hub-member 12, comprising a long sleeve 13 having a bearing on the shaft 10, and at one end having a head or flange 14 projecting outward. The bearing of the sleeve 13 on such shaft 10 is preferably a plain bearing; though that is not essential to my invention. The flange or head 14 has a hub-casing 15 bolted to its rear face, and a blade-supporting cover-plate 16 bolted to its front face, preferably by the same bolts 17. While the hub-casing 15 may be made of a casting, as indicated in Fig. 1, it is preferably made as a stamping of sheet-metal, as indicated in Figs. 4, 5, 6, and 7; and it extends axially from the flange or disk 14 as far as desired, and is there turned inward to form a closed end-wall 18, which has a central hole through which the shaft 10 projects. A lubricant-filling opening 18' may be provided at a suitable point, preferably where the axially extending part of the hub-casing turns inward into the closed-end wall, so that the opening is oblique to the axis of the shaft, which facilitates the insertion of the mouth of an oil can. The lubricant-filling opening is of course closed by a suitable plug. It is through the shaft-admitting opening in the end-wall 18 that the leakage of lubricant has heretofore mainly occurred. The hub-casing 15 usually carries a suitable pulley 19, the one shown in Fig. 1 being made of two mating parts, while the one shown in Fig. 4 is made of a single sheet-metal stamping. The hub-casing forms within it a lubricating chamber, for it is spaced circumferentially from the sleeve 13 for that purpose. The coverplate 16 has projecting spider-arms 20, to which the usual fan-blade 21 may be riveted.

In accordance with the type of fan I have shown, whereby I get a pressure lubrication as set forth in my aforesaid prior patents, I force lubricant from the lubricant chamber within the hub 15 to the bearing space between the sleeve 13 and the stud-shaft 10, and along such bearing space, and I obtain this pressure lubrication by a gear pump. This gear pump comprises a stationary sun gear 25, and a planet gear 26 meshing with said sun gear 25 and traveling around it. The stationary sun gear 25 is fixed in any suitable way on the outer or free end of the stud shaft 10, and is larger than said shaft so that it serves to hold the supporting hub 12 and its carried parts in place thereon. The planet gear 26 is mounted on a short shaft 27 carried eccentrically in the flange or head 14 of the supporting hub 12. The two gears 25 and 26 are mounted in communicating cylindrical openings 29 and 30 in the front face of the head 14, as is clear from Fig. 2. The opening 30 communicates with a lubricant-admitting hole 31 which passes through the head 14 into the lubricant-chamber formed within the hub casing 16 and communicates with said lubricant chamber close to the periphery thereof. A lubricant-discharge passage 32 leads from the discharge point, where the two openings 29 and 30 meet on one side of the line between their centers, and extends downward in the face of the head 14 to the bearing surface of the stud shaft 10 at the end thereof which carries the sun gear 25. Preferably the stud shaft 10 has a circumferential groove 33 next to said sun gear, as is clear from Fig. 1, for distributing the lubricant around the stud shaft. The rotation of the supporting hub 12 in the direction of the large arrow (see Fig. 2) causes the planet gear 26 to travel around the sun gear 25 in the same direction, and to rotate on its axis in the direction of the small arrow of Fig. 2; and this draws in lubricant through the lubricant-admitting opening 31, carries such indrawn lubricant around in the opening 30, and discharges such lubricant through the discharge passage 32 to the bearing space between the sleeve 13 and the stud shaft 10. This discharge of lubricant is with sufficient pressure to force the lubricant along such bearing space toward the supporting end of the stud shaft 10.

As so far described, the structure shown is not materially different from that shown in my aforesaid patent. If this were all, however, the lubricant would inevitably leak to some extent outward around the stud shaft 10 through the hole in the end-wall 18 of the hub casing 15. Such leakage would be especially noticeable when the rotating member comes to rest after rotation, at which time the lubricant which was held at the outside of the lubricant chamber by centrifugal force would drop to the bottom of the chamber, and much of it would flow down along the inner face of the end-wall 18 and onto the shaft 10, with some loss through such hole. There would also be a total loss of oil if the fan were stood on end, as in shipping.

It is to avoid this leakage that the various structures shown in the drawings are designed.

Referring further to the form of my invention shown in Fig. 1: Here, as also in the arrangement shown in Figs. 4, 6, and 8, the end wall 18 projects inward almost to the shaft 10, and rather closely surrounds such shaft; and is spaced axially from the adjacent end of the sleeve 13. In this axial space I mount tight on the shaft 10 a ring 35, conveniently a simple wire ring, which is quite close to the end of the sleeve 13 but does not touch it. Any oil traveling along the bearing surface toward the supporting end of the stud shaft 10 encounters such ring 35, and tries to creep outward over it. The space between the ring 35 and the end of the sleeve 13 is sufficiently small, however, so that such oil will be caught by the closely adjacent end of the sleeve 13 as it passes outward on the surface of such ring in the attempt to creep over it, and will be pulled away from the stationary ring by the rotating sleeve-end and thrown outward into the lubricant chamber by centrifugal force. The pull of the rotating member 13 on the oil film between it and the stationary ring 35 is sufficient to remove the oil from the ring 35 and throw it as just described. This effectually prevents any oil from traveling along the outer surface of the stud-shaft 10 to an escape point between said outer surface and the hole in the end-wall 18.

In order further to prevent such leakage, I provide within the opening in the end-wall 18 a deflecting member 36; which rotates with the hub-casing 15. This deflecting member 36 may be formed of sheet-metal which extends through the hole in the end-wall 18 and outward along both the inner and outer faces of such head in close contact therewith. The outer edge of the deflector-part which lies against the inner face of the end-wall 18 is provided with an oblique flange 37, which flares outward away from the face of the end-wall 18, as is clear from Fig. 1, and is approximately of frusto-conical form. This forms a circumferential trough on the inner face of the end-wall 18 surrounding the hole in such end-wall. Because the deflector 36 rotates with the end-wall 18, the two may fit so tight together that there can be no leakage between them.

When the fan is rotated, the lubricant within the lubricant chamber lies against the hub casing 15 throughout the circumference of the latter, by the action of centrifugal force. When the fan after rotating comes to a stop, the lubricant falls to the bottom of the lubricant chamber; and in doing so some of the lubricant flows down the inner face of the end-wall 18. This down-flowing film of lubricant on the inner face of the end-wall 18 strikes the circumferential trough-forming flange 37, and is deflected thereby around the hole through which the stud shaft 10 extends, and never reaches such hole. Thus the deflecting flange 37 prevents that lubricant-leakage which otherwise occurs just after the rotating member comes to a stop.

The deflector 36 also preferably lies quite close to the ring 35, though this is not essential. By having the deflector 36 and ring 35 close together, an action supplemental to that between the ring 35 and the adjacent end of the sleeve 13 is obtained. The latter action practically wholly prevents any oil from the bearing surface from traveling along the surface of the stud shaft 10 past the ring 35; but if any such lubricant does succeed in escaping the clutch of the adjacent sleeve-end and passes around the ring 35 with a possible tendency to approach the stud shaft 10 on the side of the ring 35 toward the end-wall 18, such lubricant is inevitably caught by the adjacent face of the separator 36, and torn away from the ring 35 and thrown outward by centrifugal force from the edge of the flange 37.

The deflector 36 in Fig. 1 is short axially; and does not retain any great amount of oil within the lubricant chamber if for any reason the shaft is set on end, as in shipping. Under such conditions, the oil runs out between the deflector 37 and the surface of the shaft 10. To prevent this, the deflector 36' may be lengthened axially, either for a comparatively short distance as shown in Figs. 4 and 8, or for a comparatively long distance as shown in Fig. 6. With such an axially extending deflector 36', an annular lubricant-holding chamber is formed even when the fan is set on end, so that the oil is kept away from the opening between the deflector and the shaft.

With this extended deflector, I preferably do not make the deflector as a whole with the flaring flange 37, or at least with such a sharp flare, but extend it in general more nearly parallel to the axis of the shaft, so that it very closely overlies the periphery of the ring 35; as is shown in Figs. 4 and 6. In such a sectional arrangement, any oil which tries to creep around the ring 35 and escape at the front of the adjacent end-face of the rotating sleeve 13, forms on the outside edge of the ring 35, and collects at the bottom, where it is caught by the adjacent rotating surface of the deflector 35. This tears the oil away from the ring 35, and the deflector with its flare carries the oil outward and back into the lubricant chamber.

With this construction of axially extended deflector, I preferably make the deflector as a whole almost cylindrical, or even quite so, so that it fits over the adjacent end of the sleeve 13; but at any suitable number of points around the circumference of the deflector I provide out-turned flanges or louvres 39, which are oblique as is clear from Figs. 4, 5, and 6, and these louvres have enough radial components to carry the caught oil readily outward by centrifugal force.

The deflectors so far described have all required that the sleeve 13 have its end-face machined, at a fixed dimension from the corresponding face of the flange or head 14. Otherwise, the distance between such end-face and the ring 35 would ordinarily not be sufficiently accurate. To avoid that machining, I may provide a cork ring 40 in place of the metal ring 35. This cork ring is preferably rectangular in cross-section, is located fairly tight on the shaft 10, but is of such width and such compressibility that it fills the axial space between the end face of the sleeve 13 and the opposing face of the deflector 36; as is clear from Fig. 8. When the hub-casing 15 is clamped to the flange or head 14 by the bolt 17, this also compresses slightly the cork ring 40, so that it is gripped with the rotating parts and is carried with them in their rotation, instead of remaining stationary on the shaft 10 as does the ring 35. In this case, the end face of the sleeve 13 is provided with an internal chamfer 41, around the shaft 10, and with a series of radial grooves 42; so that the oil which reaches the cork ring 40 by the pressure from the oil pump may circulate around the shaft 10 in the groove provided by the internal chamfer 41, and may pass out through the radial groove 42 to the outside face of the cork ring 40. There the oil is caught by the inner face of the deflector 36, and thrown outward along its louvres 39.

While the expedients which have already been described above are most efficient, I prefer to provide them merely as a supplemental feature of leakage-prevention. To this end, I make the radial oil-release a double release at the end of the bearing surface toward the end-wall 18. This is not shown in Fig. 1, but is shown in Figs. 4, 6, and 8. This double release uses the radial oil-release directly at the end-face of the sleeve 13 as merely a second or supplementary oil-release, and slightly removed from such end face it provides the primary oil-release. This consists of an internal groove 45 on the sleeve 13 near such end-face, which circumferential groove communicates with a plurality of radial openings 46 leading to the outside face of such sleeve. With this arrangement, the larger part of the oil which travels along the bearing surface collects in the circumferential groove 45 and is thrown outward through the holes 46 back into the lubricant chamber. Only a small portion of the oil passes axially beyond the groove 45, and this small amount is caught by the supplemental oil-release device. Such supplemental oil-release device may take the form shown in Figs. 1, 4, 6, and 8, by the provision of a ring around the shaft and close to or against the end-face of the sleeve 13. In fact, I prefer that arrangement. However, when there is this full oil-release, I may provide it by merely a second internal circumferential groove 47, like the circumferential groove 45 but nearer the end-wall 18; which second circumferential groove 47 communicates with a series of radial holes 48 corresponding to the radial holes 46. This is shown in Fig. 7. Any oil which gets past the groove 45 without being thrown outward through the holes 46 is caught almost infallibly by the groove 47 and thrown out through the holes 48; so that very little if any oil passes out beyond the end of the sleeve 13. With this arrangement, as shown in Fig. 7, it is not necessary that the end-wall 18 of the casing 15 should be beyond the end-face of the sleeve 13, and spaced therefrom; but instead the end-wall 18 may have a bearing upon the outer face of the sleeve 13 near its end, but beyond the two series of holes 46 and 48.

Thus in all of Figs. 4, 6, 7, and 8, arrangements are shown which provide the full oil-release, at axially separated points along the sleeve 13 and along the bearing surface between such sleeve and the shaft.

While the supporting stud-shaft 10 may have screw threads 11 at its support end, for mounting it in some suitable support, I prefer for such shaft a mounting of the nature shown in Fig. 4. There the shaft 10 projects into one end of a supporting arm 60 the other end of which is mounted on a stationary stud 61 parallel to the shaft 10 but offset therefrom. Both ends of the supporting arm 60 are provided with holes for receiving the shaft 10 and the stationary stud 61, which are parallel, and beyond such holes are split to provide a spring clamp, which may be clamped upon the associated shaft or stud by a clamping cross-bolt 62. The cross-bolt 62 preferably lies in a circumferential groove 63 in that end of the shaft 10 or supporting stud 61 which lies within the hole in the arm 60. By tightening the clamping cross-bolts 62, the arm 60 is held in fixed position on the supporting stud 61, and the shaft 10 is held fixed in the arm 60. This interlocking of parts definitely positions the pulley 19 in proper relation to the pulley from which it is driven. Further, this axle positioning of the pulley 19 is maintained in case either of the cross-bolts 61 or 62 become loose. By loosening the cross bolt 62 which co-operates with the supporting stud 61, it is possible to turn the arm 60 on said supporting stud to tighten or loosen the belt on the pulley 19; and to do so without danger of affecting the axial adjustment of said pulley.

I claim as my invention:—

1. In combination, a stationary shaft, a rotary member mounted on said shaft, said rotary member including a sleeve surrounding said shaft and extending along it with the shaft projecting beyond the end of the sleeve and also including a part which projects beyond the end of the sleeve and there has an end-wall extending inward toward the shaft to form a chamber, and a ring closely surrounding said shaft between the end of said sleeve and said inwardly projecting end-wall, said ring being made of compressible material, one of the abutting faces of said ring and sleeve-end being provided with one or more outwardly extending grooves communicating through their outer ends with said chamber.

2. In combination, a stationary shaft, a rotary member rotatably mounted on said shaft and having a lubricant-chamber with an end-wall through which said shaft projects, and a member fitting in the hole in the end-wall through which said shaft projects and having on the inner face of such wall an annular part which with the end-wall forms around such hole an annular trough which is substantially oil-tight at such hole, said member being formed of sheet metal extending through said hole in the end-wall and radially outward on both faces thereof.

3. In combination, a stationary shaft, a rotary member rotatably mounted on said shaft, said rotary member having a supporting sleeve surrounding said shaft and also having a lubricant chamber of which the end-wall lies beyond the end of the sleeve with a space between, said end-wall having a hole through which said shaft projects, a ring closely surrounding the shaft in said space between the end-wall and the sleeve-end and so close to the sleeve-end that a film of oil on the ring will be engaged by the sleeve-end, said sleeve-end being located inside the inner face of said end-wall, whereby any oil on such sleeve-end will be thrown outward into said lubricant chamber under the action of centrifugal force as the rotary member rotates.

4. In combination, a stationary shaft, a rotary member rotatably mounted on said shaft, said rotary member having a supporting sleeve surrounding said shaft and also having a lubricant chamber of which the end-wall lies beyond the end of the sleeve with a space between, said end-wall having a hole through which said shaft projects, a ring closely surrounding the shaft in said space between the end-wall and the sleeve-end and so close to the sleeve-end that a film of oil on the ring will be engaged by the sleeve-end, said end-wall being provided on its inner face with an annular member which with the end-wall forms an annular trough around said shaft at said hole.

5. In combination, a stationary shaft, a rotary member rotatably mounted on said shaft, said rotary member having a supporting sleeve surrounding said shaft and also having a lubricant chamber of which the end-wall lies beyond the end of the sleeve with a space between, said end-wall having a hole through which said shaft projects, a ring closely surrounding the shaft in said space between the end-wall and the sleeve-end, said end-wall being provided on its inner face with an annular member which with the end-wall forms a circumferential trough around said shaft at said hole, and said annular member lying so close to said ring that it will engage a film of lubricant thereon.

6. In combination, a stationary shaft, a rotary member rotatably mounted on said shaft and having a completely enclosed lubricant-chamber defined wholly by portions of said rotary member, said lubricant chamber having an end-wall through which said shaft projects, and a part on the inner face of said wall surrounding the hole through which the shaft projects and with the end-wall forming an annular trough around such hole, said part extending well away from the end-wall so that it forms the inner wall of an annular cup of considerable depth when the device is positioned with the shaft vertical.

7. In combination, a stationary shaft, a rotary member rotatably mounted on said shaft, said rotary member having a supporting sleeve surrounding said shaft and also having a completely enclosed lubricant chamber defined wholly by portions of said rotary member, said lubricant chamber having an end-wall which lies beyond the end of the sleeve with a space between, said end-wall having a hole through which said shaft projects, said end-wall being provided on its inner face with an annular member which with the end-wall forms an annular trough around said shaft and sleeve at said hole.

8. In combination, a stationary shaft, a rotary member rotatably mounted on said shaft, said rotary member having a supporting sleeve surrounding said shaft and also having a completely enclosed lubricant chamber defined wholly by portions of said rotary member, said lubricant chamber having an end-wall lies which beyond the end of the sleeve with a space between, said end-wall having a hole through which said shaft projects, said end-wall being provided on its inner face with an annular member which with the end-wall forms an annular trough around said shaft and sleeve at said hole, said part extending well away from the end-wall so that it forms the inner wall of an annular cup of considerable depth when the device is positioned with the shaft vertical.

9. In combination, a stationary shaft, a rotary member rotatably mounted on said shaft, said rotary member having a supporting sleeve surrounding said shaft and also having a lubricant chamber of which the end-wall lies beyond the end of the sleeve with a space between, said end-wall having a hole through which said shaft projects, a ring closely surrounding the shaft in said space between the end-wall and the sleeve-end and so close to the sleeve-end that a film of oil on the ring will be engaged by the sleeve-end, said end-wall being provided on its inner face with an annular member which with the end-wall forms an annular trough around said shaft and sleeve at said hole, said annular member including a portion which flares from both the shaft and the end-wall to produce on oil on the inner surface of such portion a component of centrifugal force tending to carry such oil back into the lubricant chamber.

10. In combination, a stationary shaft, a rotary member rotatably mounted on said shaft, said rotary member having a supporting sleeve surrounding said shaft and also having a lubricant chamber of which the end-wall beyond the end of the sleeve with a space between, said end-wall having a hole through which said shaft projects, a ring closely surrounding the shaft in said space between the end-wall and the sleeve-end and so close to the sleeve-end that a film of oil on the ring will be engaged by the sleeve-end, said end-wall being provided on its inner face with an annular member which with the end-wall forms an annular trough around said shaft and sleeve at said hole, said annular member including a portion which flares from both the shaft and the end-wall to produce on oil on the inner surface of such portion a component of centrifugal force tending to carry such oil back into the lubricant chamber, and said flaring member lying so close to said ring that it will engage a film of lubricant thereon.

11. In combination, a supporting stud, a stud shaft offset therefrom, a rotatable member mounted on said stud shaft, an arm mounted on said supporting stud and receiving the supporting end of said stud shaft, said arm being adjustable on said supporting stud, and being split at its end that receives the stud shaft, and a clamping cross-bolt for clamping together the split parts or arm-end, said supporting stud shaft being provided with a cross-groove which receives said clamping cross-bolt.

12. In combination, a supporting stud, a stud shaft offset therefrom, a rotatable member mounted on said stud shaft, an arm mounted on said supporting stud and receiving the supporting end of said stud shaft, both ends of said arm being split where they receive the co-operating ends of said stud and said stud shaft respectively, clamping cross-bolts co-operating with said split ends, said supporting stud and said stud-shaft being provided with cross-grooves for receiving the respective clamping cross-bolts.

13. In combination, a stationary shaft, a rotary member mounted on said shaft, said rotary member including a sleeve surrounding said shaft and extending along it with the shaft projecting beyond the end of the sleeve, an outer casing radially spaced from the sleeve to form a lubricant chamber between, said sleeve being provided near but spaced from one end with a lateral passage connecting the interior of said sleeve and said lubricant chamber, means operated by the rotation of said rotary member for forcing oil under pressure from said lubricant chamber, between the bearing surfaces of said shaft and sleeve, and through said passage, and means for returning to said lubricant chamber any oil which flows between the bearing surfaces of said shaft and sleeve past the opening of said passage.

14. In combination, a stationary shaft, a rotary member mounted on said shaft, said rotary member including a sleeve surrounding said shaft and extending along it with the shaft projecting beyond the end of the sleeve, an outer casing radially spaced from the sleeve to form a lubricant chamber between, said sleeve being provided near but spaced from one end with a lateral passage connecting the interior of said sleeve and said lubricant chamber, means for forcing oil under pressure from said lubricant chamber, between the bearing surfaces of said shaft and sleeve, and through said passage, and means for returning to said lubricant chamber any oil which flows between the bearing surfaces of said shaft and sleeve past the opening of said passage.

In witness whereof, I have hereunto set my hand at Jackson, Michigan, this 23d day of January, A. D. one thousand nine hundred and twenty-four.

TRUMAN B. FUNK.

CERTIFICATE OF CORRECTION.

Patent No. 1,743,712.                              Granted January 14, 1930, to

TRUMAN B. FUNK.

It is hereby certified that error appears in the printed specification of the above numbered patent requiring correction as follows: Page 5, line 62, claim 8, for the words "lies which" read "which lies"; same page, line 101, claim 10, before the word "beyond" insert the word "lies"; and that the said Letters Patent should be read with these corrections therein that the same may conform to the record of the case in the Patent Office.

Signed and sealed this 11th day of February, A. D. 1930.

(Seal)

M. J. Moore,
Acting Commissioner of Patents.